United States Patent [19]

Passmore et al.

[11] 4,387,214
[45] Jun. 7, 1983

[54] THERMOSETTING POWDER COATING COMPOSITIONS

[75] Inventors: David T. Passmore, Golborne, England; Willis C. Wooten, Kingsport, Tenn.; Paul McBride, Aughten, England

[73] Assignee: Eastman Kodak Company, Rochester, N.Y.

[21] Appl. No.: 278,228

[22] Filed: Jun. 29, 1981

[51] Int. Cl.$^3$ .................... C08G 63/12; C08G 63/18
[52] U.S. Cl. ............................... 528/296; 528/305; 528/307; 528/309; 528/308.6
[58] Field of Search ............. 528/307, 308, 309, 296, 528/305

[56] References Cited

U.S. PATENT DOCUMENTS 3,185,669  5/1965  McKinney ..................... 528/307
3,907,733  9/1975  Jackson, Jr. et al. ........... 260/22 D
4,094,721  6/1978  Sturm et al. .................... 528/302
4,197,353  4/1980  Tobias et al. ................... 528/309

OTHER PUBLICATIONS

Chemical Abstracts, 90:40330x, 1979.

*Primary Examiner*—Allan Lieberman
*Attorney, Agent, or Firm*—John F. Stevens; Daniel B. Reece, III

[57] ABSTRACT

Disclosed are crystalline polyesters having low melt viscosities, and thermosetting compositions comprising these polyesters. The compositions are especially useful as powder coatings. At least 40 mole percent of the acid moiety is a terephthalic or isophthalic acid moiety, and the polyester contains as moieties of the dihydric alcohol about 40–100 mole percent 1,6-hexanediol, the polyester being further characterized as having a molecular weight of about 700–3000, a melt viscosity of about 50–3000 cps at 160° C. and a hydroxyl number of about 30–160.

11 Claims, No Drawings

THERMOSETTING POWDER COATING COMPOSITIONS

TECHNICAL FIELD

This invention relates to thermosetting polyester compositions especially adapted for use as powder coatings.

BACKGROUND ART

Thermosetting polyesters have long been used in surface coatings. Hydroxyl and carboxyl groups are most frequently utilised to impart reactive functionality to these resins. In the area of powder coatings, hydroxyl-functional polyesters are usually cured using alkoxymelamine, anhydride or blocked isocyanate crosslinkers. Typical of the hydroxylated polyesters known for use in coating formulations are those derived from various combinations of terephthalic acid, neopentyl glycol, cyclohexanedimethanol, and polyols such as trimethylolpropane. Such polyesters are generally amorphous and have relatively high melt viscosities at fusion temperatures. These resins, at a typical fusion temperature of 160° C., have melt viscosities in excess of about 6500 cps, and often in excess of 10,000 cps.

The high melt viscosity tends to limit the flow of the molten coating and hence adversely affects the smoothness and gloss of the finished coating. Cure speed of these resins depends upon the type of crosslinking agent used, but none are recommended for use at cure schedules less than 160° C. for 35 minutes. Below these recommended temperatures, the coatings generally have a poor appearance and poor physical properties are obtained.

Patents of interest include U.S. Pat. No. 4,094,721 which discloses copolyesters of terephthalic acid, 1,4-butanediol and 1,6-hexanediol. These copolyesters, however, have a relatively high molecular weight and a relatively high melt viscosity, which satisfies the requirements for the intended purpose, i.e., a fusion adhesive. The high melt viscosity tends to limit the flow of the molten coating and hence adversely affects the smoothness and gloss of the finished coating.

DISCLOSURE OF THE INVENTION

The crystalline polyesters described herein have several advantageous properties which render them superior to the conventional amorphous thermoset polyesters currently used in powder coatings, e.g., (a) The crystalline polyesters of a given molecular weight tend to have lower melt viscosities than those normally associated with the amorphous polyesters of similar molecular weight which are currently used in powder coatings. This means that powder coatings based on these crystalline, thermoset polyesters generally flow better on fusion, resulting in less orange peel and smooth coatings having high gloss.

(b) The crystalline polyesters react more rapidly with the blocked isocyanate crosslinker than would be expected. This results in coating formulations which can cure at temperatures as low as 150° C. With suitable curing agents, even lower curing temperatures might be achieved.

(c) The crystalline polyesters, when incorporated into powder formulations cured with blocked isocyanate crosslinker, give finished coatings having outstanding physical properties.

(d) The crystalline nature of the resins enhances their anti-blocking properties at room temperature. Amorphous resins having similar molecular weight distribution to the crystalline copolyesters would be expected to undergo more pronounced blocking on storage at ambient conditions.

(e) The crystalline polymers impart a more rapid build-up of physical properties to the coatings during fusion compared to currently used commercial resins.

(f) The composition of the inherent low viscosity of the crystalline resins and the high level of physical properties they impart to the final coating, enables significantly higher filler concentrations to be used in formulations based on crystalline resins compared to formulations containing amorphous resins of similar molecular weight distribution.

The present invention provides copolyesters particularly useful in thermosetting compositions, more particularly, thermosetting powder coating compositions such as might be used as automobile coatings. The copolyesters are linear, saturated and crystalline, having functional hydroxyl groups, acid moieties and dihydric alcohol moieties, at least 40 mole percent of the acid moieties being terephthalic or isophthalic acid moieties. The polyester contains as moieties of the dihydric alcohol about 40–100 mole percent 1,6-hexanediol and 0 to about 60 mole percent of at least one glycol selected from the group consisting of ethylene glycol, 1,4-butanediol, neopentyl glycol, and 1,4-cyclohexanedimethanol.

According to this invention, there is provided a crystalline polyester which is especially useful in the production of thermosetting powder coating compositions, such as might be used as automobile coatings. The polyester may be described generally as a linear, saturated, crystalline polyester of acid moieties and dihydric alcohol moieties. The polyester is further characterized as having a number average molecular weight of about 700–3000, preferably about 1000–2000. Also, the polyesters have a melt viscosity of about 50–3000 cps at 160° C. The hydroxyl number is in the range of about 30–160, preferably about 50–125.

The polyesters described herein have the unique ability to form thermosetting powder coatings which have low melt viscosities, thereby allowing the powder to flow out to form a smooth coating prior to setting up. On the other hand, the powder is more resistant to caking than amorphous polyesters of similar molecular weight distribution.

The copolyesters of the invention contain terephthalic or isophthalic acid moieties. These moieties can be supplied by the usual terephthalic or isophthalic moiety sources, e.g., terephthalic acid, terephthaloyl chloride and the mono- and dialkyl esters of terephthalic acid. Thus, the term "terephthalic moiety" or "terephthalic acid moiety" is to be considered as including those moieties supplied by the acid chloride or a mono- or diester. The polyester contains terephthalic or isophthalic acid in an amount of at least 40 mol %, based upon the acid moieties. Stated differently, the copolyester of the invention is a terephthalic or isophthalic acid copolyester in which from 1 to 60 mol percent of terephthalic or isophthalic acid moieties are replaced, if desired, by a second acid moiety.

If a portion of the terephthalic or isophthalic acid moiety is replaced by a second acid moiety, it is replaced by a saturated aliphatic dicarboxylic acid having terminal carboxylic acid groups having from 4 to about 34 carbon atoms between the two carboxyl groups. Preferably, the saturated aliphatic dicarboxylic acid contains between 4 and 8 carbon atoms between the carboxyl groups. Examples of aliphatic dicarboxylic acids contemplated include adipic, azelaic or sebacic acid or mixtures thereof.

The diol component of the copolyesters of the invention preferably comprises one or more glycols selected from ethylene glycol, 1,4-butanediol, neopentyl glycol, or 1,4-cyclohexanedimethanol and 1,6-hexanediol where the combined quantities of these diols constitute all of the diol component.

With respect to the aliphatic or the aromatic dicarboxylic acids, polyester forming derivatives can be used in the preparation of the polyester, especially the mono- or dialkyl esters of the named dicarboxylic acids, especially $C_1$-$C_4$ mono- or dialkyl esters, particularly the dimethyl esters.

In a preferred embodiment of the invention, part of the dicarboxylic acid or glycol moieties of the polyester are replaced by polyols or polybasic acids (having three or more functional groups) to enhance crosslinking. The preferred polyfunctional material is trimethylolpropane. Other suitable polyols include trimethylolethane, pentaerythritol, glycerine, sorbitol, etc. Suitable polybasic acids include trimellitic anhydride. If such polyfunctional materials are used, it is preferred that they be used in amounts of between about 0.1 and about 12 mole percent.

The polyesters according to this invention are prepared using conventional esterification techniques well known in the art. Some excess glycol is used, and the reaction is such that the polymer is of a relatively low molecular weight, i.e., about 700-3000. The excess glycol and low molecular weight provide for the functional hydroxyl groups in the polymer for crosslinking, thereby making the polymer thermosetting.

Suitable curing or crosslinking agents for use with thermosetting resins containing functional hydroxyl groups, i.e., the polyester disclosed herein, are well known in the art. Such curing agents include blocked isocyanates, melamines and polyfunctional epoxy compounds containing at least two glycidyl groups. An example of a preferred isocyanate is Huls B1530, a caprolactam-blocked polyfunctional isocyanate. Suitable melamines include alkoxymelamine wherein the alkoxy group contains 1 to 8 carbon atoms. Specific examples are Cymel 300 and Cymel 303 hexamethoxymethyl melamines. The curing agents are used in amounts of between about 10% and 40%, preferably 15-30%, based on the weight of polyester. By blocked curing agents, it is meant that the curing agent is temporarily deactivated or neutralized so as to allow the powder to flow out and form a smooth coating prior to crosslinking. Blocked curing agents and catalysts are well known in the art, e.g., U.S. Pat. No. 3,842,021. In any case, it is preferred that the curing agent be blocked, so as to allow complete flow-out of the powder to eliminate or reduce orange-peel and thereby produce a smooth coating prior to the coating setting up.

Although the thermosetting composition containing the polyester and curing agent has been found to cure without the use of a catalyst at temperatures as low as about 150° C., it is sometimes desirable to use a catalyst. Suitable catalysts are well known in the art and include acid catalysts such as p-toluenesulfonic acid for melamines and dibutyl tin dilaurate for isocyanates.

The thermosetting composition may also contain a suitable plasticizer. The plasticizer must be sufficiently compatible to avoid a sticky formulation. Suitable plasticizers include dioctyl phthalate, dibutyl phthalate, butyl benzyl phthalate, dicyclohexyl phthalate, 2,2,4-trimethylpentanediol-1,3-monoisobutyrate monobenzoate, trioctyl trimellitate, an ester derived from neopentyl glycol and adipic acid, or the like.

Conventional stabilizers, such as Irganox 1093, a product of Ciba-Geigy, may be used in small amounts to prevent discoloration, etc. Also, conventional dyes or pigments such as R-100 titanium dioxide pigment marketed by Du Pont may be used. Conventional flow aids, fillers, preservatives, etc., may also be used.

The components of the compositions according to this invention may be mixed by dry blending in a mixer or blender (e.g., a Waring Blender), followed by compounding in a Buss Ko-Kneader, Wearner and Pfleiderer or similar extrusion mixing machine at 90°-140° C. and 30-100 r.p.m., granulating, grinding and then screening to obtain a 150 mesh powder for coating. Also, the polyester pigment and stabilizer, if used, may be extruded at about 200° C., then mixed with the crosslinking agent, catalyst, and plasticizer (if used) in a Banbury mixer, a combination of a Banbury mixer and roll mill, a roll mill alone or an extruder at a temperature of between about 90° C. and 150° C. Alternately, all the components may be dissolved in a solvent such as methylene chloride (at about 20 weight percent solids) and spray dried at a chamber temperature of about 50° C. by well-known techniques.

The powdered composition may be deposited on the substrate by use of a powder gun, by electrostatic deposition or by deposition from a fluidized bed or by other well-known methods of powder deposition. After deposition the powder is heated to a temperature sufficient to cause its particles to flow and thus fuse together to form a smooth, uniform, continuous, uncratered coating on the substrate surface.

The following examples are submitted for a better understanding of the invention. In the examples, the physical properties of the coatings are determined as follows:

Peel Adhesion

Because powder coatings generally have superior adhesion properties to wet paints, the adhesion tape test commonly used for wet systems is often abandoned in favor of the more demanding peel adhesion test. In this test a scalpel is used to cut two intersecting lines, each about 2 cm. long, at about 60° to one another. The tip of the scalpel is used to try to lift the coating from the substrate. If the coating can be removed easily, the test result is rated as "fail". If the coating cannot be removed from the substrate, except by scraping, then a "pass" is recorded.

Acetone Resistance

The softening of the coating caused by acetone being applied to the surface is determined.

Caking Test 100 mls of powder are poured into a 27 mm diameter measuring cylinder which is then placed in a forced air oven at a constant temperature of 40° C. The powder is examined for loss of free-flowing properties after 24, 48, 72, 96 and 168 hours.

Orange Peel

The orange peel effect is rated on a scale from 1 (severe orange peel) to 8 (no orange peel) using a set of standard panels for comparison. At the lower levels of orange peel, in the range of ratings 7 to 8, a set of ten standard panels is used to give more accurate assessment, and panels in this range are rated to an accuracy of two figures, e.g., 7.1, 7.5, etc.

Impact Strength

Impact strength is determined by using a Gardner Laboratory, Inc., Impact Tester. A weight is dropped within a slide tube from a specified height to hit a punch having a ⅝ inch diameter hemispherical nose which is driven into the front (coated face) or back of the panel. The highest impact which does not crack the coating is recorded in inch-pounds, front and reverse.

Flexibility

The test panel is bent over a period of 15 seconds, using a Gardner Laboratory, Inc., conical mandrel of specified size, according to ASTM D-522. A pass or fail is recorded.

Gloss

Twenty degree and sixty degree gloss are measured using a gloss meter (Gardner Laboratory, Inc., Model GG-9095) according to ASTM D-523.

Pencil Hardness

The pencil hardness of a coating is that of the hardest pencil that will not cut into the coating. The procedure for preparing the truncated cone pencil lead and carrying out the test is given in the National Coil Coaters Association Technical Bulletin No. II (Aug. 12, 1968). Results are expressed according to the following scale:
(softest) 6B, 5B, 4B, 3B, 2B, HB, F, H, 2H, 3H, 4H, 5H, 6H (hardest)

Coating Thickness

The coating thickness is determined using a Fischer Instrumentation (GB) Ltd. Permascope Model ES 8e 3K 4.

Fusion of the Coating

Test panels are placed in a Gallenkamp forced air oven and fused at a specified temperature for a specified time. The fused coatings are then hung on a bar to cool at room temperature.

Examples 1 and 2 which follow illustrate typical techniques for forming the polyesters according to this invention.

EXAMPLE 1

Two thousand thirty seven g. (10.5 moles) of dimethyl terephthalate, 1062 g (9 moles) of 1,6-hexanediol, 270 g (3 moles) of 1,4-butanediol and 2 g of dibutyl tin oxide are heated under nitrogen in a conventional single stage reaction. Cook log is shown below.

| Process Time (Hr.) | Temp. °C. | Distillate (ml) |
| --- | --- | --- |
| 6 | 0–200 | — |
| approx. 2 | 200–225 | 820 (Theory = 840) |

| Process Time (Hr.) | Temp. °C. | Distillate (ml) |
| --- | --- | --- |
| Resin Properties | | |
| Molecular Wt. | = 1,338 | |
| Hydroxyl No. | = 88 | |
| Acid No. | = <1 | |
| Melt viscosity at 160° C. | = 215 cp. | |

EXAMPLE 2

Seventeen hundred g. of dimethyl terephthalate, 1216 g. 1,6-hexanediol, 48 g trimethylol propane and 3 g of dibutyl tin oxide are heated under nitrogen in a conventional single stage process according to the following cook log.

| Process Time (hr) | Temp. (°C.) | Distillate (ml) |
| --- | --- | --- |
| 0 | 22 | — |
| 1.25 | 140 | 100 |
| 1.5 | 165 | 310 |
| 2.0 | 195 | 630 |
| 2.5 | 200 | 670 |
| 3.5 | 200 | 680 |
| 6.5 | 180 | 680 (Theory = 710) |
| Resin Properties | | |
| Hydroxyl No. | = 81 | |
| Acid No. | = <1 | |
| Molecular Wt. | = 1200 (Theory = 1500) | |

Other resins prepared in a conventional manner, similar to Examples 1 and 2, are given in Table 1, Examples 3–12 and 75–82. Dimethyl terephthalate is used in all examples as the dicarboxylic acid. 1,6-Hexanediol is used with other glycols as noted.

TABLE 1

| Ex. No. | % 1,4-Butanediol | Molecular Wt. | Hydroxyl No. | Melt Viscosity* (cps at 160° C.) | Softening Range °C. |
| --- | --- | --- | --- | --- | --- |
| 3 | 0 | 1174 | 73 | 150 | 99–144 |
| 4 | 0 | 2100 | 62 | 362 | 118–156 |
| 5 | 25 | 820 | 82 | 65 | 81–120 |
| 6 | 25 | 1338 | 88 | 215 | 88–136 |
| 7 | 50 | 860 | 122 | 84 | 96–154 |
| 8 | 50 | 1018 | 62 | 257 | 114–160 |
| 9 | 75 | 894 | 100 | 760 | 92–190 |
| 10 | 75 | 1342 | INSOL | — | 158–200 |
| 11 | 0 | 1200 | 81 | 632 | 80–120 |
| 12 | 0 | 2200 | 81 | 906 | 96–138 |

*The polyester of Ex. 11 is modified with 4 mole % trimethylolpropane. The polyester of Ex. 12 is modified with 12 mole % trimethylolpropane.

Direct comparison of the melt viscosities at 160° C. of selected crystalline resins relative to currently used commercial resins (R, S and T) of comparable molecular weight and hydroxyl number is made in Table 2. These results clearly show the very low melt viscosity of the crystalline resins relative to the conventional polymers.

TABLE 2

| Resin | Molecular Wt. | Hydroxyl No. | Melt Viscosity (cps at 160° C.) |
| --- | --- | --- | --- |
| From Ex. 4 | 2100 | 62 | 362 |
| From Ex. 12 | 2200 | 81 | 906 |
| R | 2400 | 56 | >10,000 |
| S | 1850 | 59 | 6,700 |
| T | 2700 | 62 | >10,000 |

The properties of the crystalline resins make them particularly suited for use in powder coatings, both in high filler content auto primer surfacer formulations and high gloss top coat formulations for a wide variety of metal products, e.g., appliances, furniture, cycles, etc. The performance of representative resins in powder primer surfacers is shown in Examples 13–56. Included for comparison is the performance of formulations based on a commercial polyester. The crosslinking agent used in all cases is a caprolactam-blocked polyfunctional isocyanate.

TABLE 3

CRYSTALLINE HYDROXYLATED POLYESTERS IN AUTO PRIMER SURFACER FORMULATIONS

| COMPONENT | Parts By Weight | | | | | |
|---|---|---|---|---|---|---|
| | A | B | C | D | E | F |
| Resin S | 80 | — | — | — | — | — |
| From Ex. 4 | — | 76.7 | — | — | — | — |
| From Ex. 6 | — | — | 69.6 | — | — | — |
| From Ex. 8 | — | — | — | 76.7 | — | — |
| From Ex. 11 | — | — | — | — | 71.4 | — |
| From Ex. 12 | — | — | — | — | — | 71.4 |
| Crosslinking Agent | 20 | 23.3 | 30.1 | 23.3 | 28.6 | 28.6 |
| Filler | 90 | 90 | 90 | 90 | 90 | 90 |
| Plasticizer | 5 | 5 | 5 | 5 | 5 | 5 |
| Polymerized Debutanized Aromatic Hydrocarbon Resin | 5 | 5 | 5 | 5 | 5 | 2.5 |
| Flow Modifier | 1 | 1 | 1 | 1 | 1 | 1 |
| Volatiles Release Agent | 0.5 | 0.5 | 0.5 | 0.5 | 0.5 | 0.5 |
| 5:1 Resin H:Catalyst | — | — | — | — | — | 3.0 |
| Titanium Dioxide | 10 | 10 | 10 | 10 | 10 | 10 |
| Mix Temperature (°C.) | 120 | 110 | 100 | 90 | 120 | 120 |

All of the primer surfacer formulations readily cured at 163° C. for 45 minutes to give finishes having low orange peel. However, the formulations based on the crystalline resins gave physical properties superior to those obtained using the commercial resin. Furthermore, the crystalline polyester-based formulations maintained their high performance even on curing at 150° C. for 45 minutes. On the other hand, the control primers completely lost their physical properties on curing at this lower temperature. This clearly demonstrates the novel low temperature cure properties of the crystalline polyesters.

Two of the crystalline polyesters (Example 8 and Example 11) give high gloss coatings of excellent physical properties even on curing at 180° C. for 5 minutes. Under these cure conditions, the commercial resin gives low gloss finishes having poor physical properties.

Examples 13–56 are examples of physical properties of Formulations A–F in a coating. Fusion time is 45 minutes. The following table applies to these examples.

| Example | Fusion Temperature | Formulation |
|---|---|---|
| 13–15 | 163 | A |
| 16–19 | 163 | B |
| 20–24 | 163 | C |
| 25–29 | 163 | D |
| 30–33 | 163 | E |
| 34–36 | 163 | F |
| 37–38 | 150 | A |
| 39–42 | 150 | B |
| 43–45 | 150 | C |
| 45–50 | 150 | D |
| 51–53 | 150 | E |
| 54–56 | 150 | F |

| Ex. | Thickness m | 20° Gloss | Peel Adhesion | Pencil Hardness | Orange Peel Rating | Impact Resistance Front (in. lbs.) | Impact Resistance Reverse (in. lbs.) | Flexibility |
|---|---|---|---|---|---|---|---|---|
| 13 | 21 | 36 | Pass | 3H | 2 | >160 | 140 | 7 mm Cracking |
| 14 | 34 | 40 | Pass | 3H | 6–7 | 80 | 60 | 11 mm Cracking |
| 15 | 49 | 40 | Pass | 2H | 7 | 60 | 8 | 27 mm Cracking |
| 16 | 18 | 21 | Pass | 2H | 5 | >160 | >160 | No Cracking |
| 17 | 31 | 17 | Pass | HB | 7 | >160 | >160 | No Cracking |
| 18 | 39 | 17 | Pass | B | 7 | >160 | >160 | No Cracking |
| 19 | 64 | 17 | Pass | B | 7 | >160 | >160 | No Cracking |
| 20 | 18 | 40 | Pass | F | 7.1 | >160 | >160 | No Cracking |
| 21 | 27 | 45 | Pass | HB | 7.1 | >160 | >160 | No Cracking |
| 22 | 34 | 52 | Pass | B | 7.1 | >160 | 160 | No Cracking |
| 23 | 50 | 53 | Pass | B | 7.5 | >160 | >160 | No Cracking |
| 24 | 70 | 51 | Pass | B | 7.7 | >160 | >160 | No Cracking |
| 25 | 21 | 39 | Pass | H | 7 | >160 | >160 | No Cracking |
| 26 | 36 | 42 | Pass | HB | 7.1 | >160 | >160 | No Cracking |
| 27 | 48 | 34 | Pass | HB | 7.1 | >160 | >160 | No Cracking |
| 28 | 63 | 45 | Pass | HB | 7.6 | >160 | >160 | No Cracking |
| 29 | 71 | 45 | Pass | HB | 7.6 | >160 | >160 | No Cracking |
| 30 | 20 | 15 | Pass | 2H | 4 | >160 | >160 | No Cracking |
| 31 | 30 | 23 | Pass | HB | 7 | >160 | >160 | No Cracking |
| 32 | 49 | 30 | Pass | HB | 7.3 | >160 | >160 | No Cracking |
| 33 | 68 | 27 | Pass | HB | 7.5 | >160 | >160 | No Cracking |
| 34 | 23 | 5 | Pass | 2H | 2 | >160 | >160 | No Cracking |
| 35 | 39 | 6 | Pass | 2H | 3 | >160 | >160 | 5 mm Cracking |
| 36 | 55 | 5 | Pass | 2H | 4 | >160 | 80 | 15 mm Cracking |
| 37 | 23 | | Pass | 2H | | 40 | 8 | |
| 38 | 72 | | Pass | HB | | 8 | <2 | |
| 39 | 24 | 21 | Pass | F | 5 | >160 | >160 | No Cracking |
| 40 | 37 | 19 | Pass | B | 7 | >160 | >160 | No Cracking |
| 41 | 45 | 20 | Pass | B | 7 | >160 | >160 | No Cracking |
| 42 | 66 | 18 | Pass | B | 7 | >160 | >160 | No Cracking |
| 43 | 19 | 40 | Pass | F | 7 | >160 | >160 | No Cracking |
| 44 | 50 | 51 | Pass | B | 7.7 | >160 | >160 | No Cracking |
| 45 | 66 | 53 | Pass | B | 7.8 | >160 | >160 | No Cracking |
| 46 | 18 | 41 | Pass | H | 5 | >160 | >160 | No Cracking |
| 47 | 29 | 43 | Pass | F | 6–7 | >160 | >160 | No Cracking |
| 48 | 38 | 41 | Pass | HB | 7 | >160 | >160 | No Cracking |

-continued

| Ex. | Thickness m | 20° Gloss | Peel Adhesion | Pencil Hardness | Orange Peel Rating | Impact Resistance Front (in. lbs.) | Reverse (in lbs.) | Flexibility |
|---|---|---|---|---|---|---|---|---|
| 49 | 51 | 42 | Pass | HB | 7.3 | >160 | >160 | No Cracking |
| 50 | 69 | 43 | Pass | B | 7.3 | >160 | >160 | No Cracking |
| 51 | 17 | 48 | Pass | F | 7 | >160 | >160 | No Cracking |
| 52 | 38 | 45 | Pass | B | 7.3 | >160 | >160 | No Cracking |
| 53 | 69 | 61 | Pass | 2B | 7.6 | >160 | >160 | No Cracking |
| 54 | 29 | 16 | Pass | H | 2-3 | >160 | >160 | No Cracking |
| 55 | 49 | 19 | Pass | F | 4 | >160 | 100 | 10 mm Cracking |
| 56 | 79 | 20 | Pass | HB | 6 | 80 | 8 | 62 mm Cracking |

The crystalline polymers impart a more rapid build-up of mechanical properties to the coatings during fusion compared to currently used commercial resins. They also tend to give higher physical properties in thicker films, as shown in the following examples:

| Ex. | Resin Used In Formulation | Cure Time (Min.) At 163° C. | Thickness (m) | Impact (inch/lbs) Front | Reverse | Flexibility |
|---|---|---|---|---|---|---|
| 57 | Commercial Resin having molecular wt. of 1800 and hydroxyl No. of 59 | 15 | 58 | 8 | <2 | Cracking All Along |
| 58 |  | 30 | 53 | 32 | 2 | Cracking All Along |
| 59 |  | 45 | 49 | 60 | 4 | 33 mm Cracking |
| 60 | Polyester of terephthalic acid, 50 mole % 1,6-hexanediol and 50 mole % 1,4-butanediol | 15 | 51 | 16 | <2 | No Cracking |
| 61 |  | 30 | 47 | >160 | >160 | No Cracking |
| 62 |  | 45 | 51 | >160 | >160 | No Cracking |

It can be seen that the formulation according to this invention achieves maximum physical properties between 15–30 minutes, while that based on the commercial resin only gives maximum properties after 45 min.

In the following examples, the polyester is derived from terephthalic acid. The glycols are 1,6-hexanediol and as indicated.

| Ex. | Glycols | Hydroxyl No. | Mol. Wt. | Melt Viscosity (cps. at 160° C.) | Softening Range °C. (D.S.C.) |
|---|---|---|---|---|---|
| 63 | 25 mole % ethylene glycol | 36 | 1,800 | 685 | 64–140 |
| 64 | 50 mole % ethylene glycol | 44 | 1,500 | 927 | 80–140 |
| 65 | 25 mole % neopentyl glycol | 63 | 960 | 316 | 80–130 |
| 66 | 50 mole % neopentyl glycol | 47 | 1,570 | 2,319 | — |
| 67 | 22 mole % 1,4-cyclohexanedimethanol | 71 | 970 | 474 | 92–150 |
| 68 | 22 mole % cyclohexanedimethanol | 41 | 1,800 | 1,160 | 100–160 |
| 69 | 30 mole % cyclohexanedimethanol | 61 | 1,260 | 740 | 100–134 |
| 70 | 43 mole % cyclohexanedimethanol | INSOL | 1,160 | — | 160–192 |

For comparison, three commercial thermoset polyesters have the following properties:

| Ex. | Resin | Molecular Wt. | Hydroxyl No. | Melt Viscosity (cps at 160° C.) |
|---|---|---|---|---|
| 71 | X | 2,400 | 56 | <10,000 |
| 72 | Y | 1,850 | 59 | 6,700 |
| 73 | Z | 2,700 | 62 | <10,000 |

The following formulations G, H and I are polyesters of terephthalic acid and 1,6-hexanediol, containing respectively as a second glycol 22 mole % 1,4-cyclohexanedimethanol, 25 mole % neopentyl glycol and 25 mole % ethylene glycol. The molecular weights of the resins used in Formulations G, H and I are 970, 960 and 1800 respectively.

| Crystalline Resins in Primer Surfacer Formulations | Parts by Weight | | |
|---|---|---|---|
|  | G | H | I |
| Resin From Ex. 67 | 74.3 | — | — |
| Resin From Ex. 65 | — | 76.4 | — |
| Resin From Ex. 68 | — | — | 85.0 |
| Caprolactam-Blocked Isocyanate | 25.7 | 23.6 | 15.0 |
| Filler | 90.0 | 90.0 | 90.0 |
| Polymerized Debutanized Hydrocarbon Resin | 5.0 | 5.0 | 5.0 |
| Flow Modifier | 1.0 | 1.0 | 1.0 |
| Volatiles Release Agent | 0.5 | 0.5 | 0.5 |
| Titanium Dioxide | 10.0 | 10.0 | 10.0 |

In the following examples, Formulations G, H and I are used in primer surface application. Fusion time is 45 minutes and the fusion temperature is 163° C. In Example 74-76, Formulation G is used; in Examples 77-80, Formulation H is used; and in Examples 81-83, Formulation I is used.

| Ex. | Thickness m | 20° Gloss | Peel Adhesion | Pencil Hardness | Orange Peel Rating | Impact Resistance Front (in. lbs.) | Impact Resistance Reverse (in. lbs.) | Flexibility |
|---|---|---|---|---|---|---|---|---|
| 74 | 27 | 30 | Pass | HB | 6 | >160 | >160 | No Cracking |
| 75 | 42 | 28 | Pass | HB | 6-7 | >160 | >160 | No Cracking |
| 76 | 64 | 24 | Pass | HB | 7 | >160 | >160 | No Cracking |
| 77 | 20 | 41 | Pass | F | 4 | >160 | >160 | No Cracking |
| 78 | 33 | 44 | Pass | HB | 5 | >160 | >160 | No Cracking |
| 79 | 54 | 44 | Pass | HB | 6-7 | >160 | >160 | No Cracking |
| 80 | 70 | 42 | Pass | HB | 6-7 | >160 | >160 | No Cracking |
| 81 | 26 | 54 | Pass | HB | 6 | >160 | >160 | No Cracking |
| 82 | 40 | 55 | Pass | HB | 6-7 | >160 | >160 | No Cracking |
| 83 | 66 | 55 | Pass | B | 7.1 | >160 | >160 | No Cracking |

Examples 84-96, based on the formulations given in the following table, demonstrate the coating properties of powder top coats based on crystalline polyesters. Fusion time and temperature for Examples 84-88, 89-92 and Examples 93-96 are 20 minutes, 163° C.; 5 minutes, 180° C. and 10 minutes, 180° C., respectively.

| Ex. | Thickness um | Gloss 20° | Peel Adhesion | Pencil Hardness | Acetone Resistance | Appearance Orange Peel | Impact Resistance Front in/lbs | Impact Resistance Reverse in/lbs | Flexibility | Formulation |
|---|---|---|---|---|---|---|---|---|---|---|
| 84 | 29 | 45 | Pass | F | Slight Break-Up | 6-7 | >160 | >160 | No Cracking | J |
| 85 | 64 | 55 | Pass | HB | Slight Break-Up | 7.4 | >160 | 100 | 17mm Cracking | |
| 86 | 48 | 75 | Pass | 2B | Slight Softening | 7.1 | >160 | >160 | No Cracking | K |
| 87 | 52 | 85 | Pass | 2B | Slight Softening | 7.5 | >160 | >160 | No Cracking | L |
| 88 | 55 | 85 | Pass | 2B | Slight Softening | 7.7 | >160 | >160 | No Cracking | M |
| 89 | 52 | 25 | Pass | HB | Swelling | 7.4 | 40 | 2 | 40mm Cracking | J |
| 90 | 42 | 33 | Pass | B | Slight Softening | 7.3 | 20 | <2 | 40mm Cracking | K |
| 91 | 41 | 74 | Pass | B | Slight Softening | 7 | >160 | >160 | No Cracking | L |
| 92 | 48 | 74 | Pass | B | Slight Softening | 7.7 | >160 | >160 | No Cracking | M |
| 93 | 48 | 26 | Pass | HB | Slight Softening | 7.4 | >160 | >160 | 24mm Cracking | J |
| 94 | 61 | 46 | Pass | B | Slight Softening | 7.6 | >160 | >160 | No Cracking | K |
| 95 | 36 | 65 | Pass | B | Slight Softening | 7 | >160 | >160 | No Cracking | L |
| 96 | 36 | 69 | Pass | B | Very Slight Softening | 7.7 | >160 | >160 | No Cracking | M |

PIGMENTED POWDER TOPCOAT FORMULATIONS BASED ON CRYSTALLINE THERMOSET POLYESTERS

| Component | Parts by Weight J | K | L | M |
|---|---|---|---|---|
| Resin Y | 80 | — | — | — |
| From Ex. 4 | — | 76.7 | — | — |
| From Ex. 8 | — | — | 76.7 | — |
| From Ex. 11 | — | — | — | 71.4 |
| Plasticizer | 5 | 5 | 5 | 5 |
| Flow Modifier | 1 | 1 | 1 | 1 |
| Volatile Release Agent | 0.5 | 0.5 | 0.5 | 0.5 |
| Titanium Dioxide | 50 | 50 | 50 | 50 |
| Crosslinking Agent | 20 | 23.3 | 23.3 | 28.6 |

When used in powder topcoat formulations, cured for 20 min. at 163° C., the crystalline polyesters, gave coatings having excellent physical properties, low orange peel and a significantly higher gloss than that obtained for the commercial resins. The same pattern is maintained on cure at 180° C./10 min. The high gloss finish characteristic of the crystalline resins is believed to be due to their outstanding flow properties, imparted to the coatings by virtue of the low melt viscosity of these polymers.

Hydroxyl number is a conventional, well-known term, meaning the number in terms of milligrams of potassium hydroxide per gram of sample, over and above the amount required to neutralize any acid groups that are present.

Number average molecular weight (used herein) is also a conventional term, and is determined by the well-known technique of vapor pressure osmometry.

Viscosity is determined in centipoises at specified temperatures using a conventional Shirley-Ferranti Viscometer at a shear rate of 563 sec$^{-1}$.

Unless otherwise specified, all parts, percentages, ratios, etc., are by weight.

The invention has been described in detail with particular reference to certain preferred embodiments thereof, but it will be understood that variations and modifications can be effected within the spirit and scope of the invention.

What is claimed is:

1. A linear saturated crystalline polyester of an acid moiety and a moiety of a dihydric alcohol, at least 40 mole percent of the acid moiety being a terephthalic or isophthalic acid moiety, said polyester containing as moieties of the dihydric alcohol at least 40 mole percent 1,6-hexanediol, said polyester being further characterized as having a molecular weight of about 700–3000, a melt viscosity of about 50–3000 cps at 160° C. and a hydroxyl number of about 30–160.

2. A polyester according to claim 1 containing moieties of at least one other glycol selected from the group consisting of ethylene glycol, 1,4-butanediol, neopentyl glycol and 1,4-cyclohexanedimethanol.

3. A polyester according to claim 2 wherein the glycol is 1,4-butanediol.

4. A polyester according to claim 1 wherein the molecular weight is about 1000–2000.

5. A polyester according to claim 1 wherein the hydroxyl number is about 50–125.

6. A linear saturated crystalline polyester of an acid moiety and a moiety of a dihydric alcohol, at least 40 mole percent of the acid moiety being a terephthalic acid moiety, said polyester containing as moieties of the dihydric alcohol at least 40 mole percent 1,6-hexanediol, said polyester being further characterized as having a molecular weight of about 1000–2000, a melt viscosity of about 50–1000 cps at 160° C. and a hydroxyl number of about 50–125.

7. A linear saturated crystalline polyester of an acid moiety and a moiety of a dihydric alcohol, at least 40 mole percent of the acid moiety being a terephthalic acid moiety, said polyester containing as moieties of the dihydric alcohol at least 40 mole percent 1,6-hexanediol and a second glycol selected from the group consisting of ethylene glycol, 1,4-butanediol, neopentyl glycol and 1,4-cyclohexanedimethanol, said polyester being further characterized as having a molecular weight of about 1000–2000, a melt viscosity of about 50–1000 cps at 160° C. and a hydroxyl number of about 50–125.

8. A polyester according to claim 1 wherein from about 0.1 to about 12 mole % of the acid moiety is replaced with a polybasic acid having at least three functional groups.

9. A polyester according to claim 8 wherein the polybasic acid is trimellitic anhydride.

10. A polyester according to claim 7 wherein from about 0.1 to about 12 mole % of the acid moiety is replaced with a polybasic acid having at least three functional groups.

11. A polyester according to claim 10 wherein the polybasic acid is trimellitic anhydride.

* * * * *